(12) United States Patent
Kawahata et al.

(10) Patent No.: US 6,909,537 B2
(45) Date of Patent: Jun. 21, 2005

(54) DISPERSION COMPENSATOR WHOSE TRANSMISSION BAND IS FLATTENED

(75) Inventors: Yuichi Kawahata, Kawasaki (JP); Nobuaki Mitamura, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 9 days.

(21) Appl. No.: 10/340,842

(22) Filed: Jan. 13, 2003

(65) Prior Publication Data

US 2003/0147121 A1 Aug. 7, 2003

(30) Foreign Application Priority Data

Jan. 16, 2002 (JP) ........................................ 2002-006824

(51) Int. Cl.$^7$ ................................................ H01S 3/00
(52) U.S. Cl. .................... 359/337.5; 398/147
(58) Field of Search .................... 398/147; 359/337, 359/337.5

(56) References Cited

U.S. PATENT DOCUMENTS

| | | | |
|---|---|---|---|
| 5,930,045 A | 7/1999 | Shirasaki | |
| 5,969,865 A | 10/1999 | Shirasaki | |
| 5,969,866 A | 10/1999 | Shirasaki | |
| 5,973,838 A | 10/1999 | Shirasaki | |
| 5,999,320 A | 12/1999 | Shirasaki | |
| 6,028,706 A | 2/2000 | Shirasaki et al. | |
| 6,332,689 B1 | 12/2001 | Shirasaki et al. | |
| 6,556,320 B1 * | 4/2003 | Cao | 398/65 |
| 6,668,115 B2 * | 12/2003 | Lin et al. | 385/37 |
| 6,714,705 B1 * | 3/2004 | Lin et al. | 385/37 |
| 6,744,991 B1 * | 6/2004 | Cao | 398/147 |
| 2002/0044738 A1 | 4/2002 | Jablonski et al. | |
| 2003/0128431 A1 | 7/2003 | Mitamura et al. | |

FOREIGN PATENT DOCUMENTS

| | | |
|---|---|---|
| WO | WO 96/31961 | 10/1996 |
| WO | WO 02/23234 | 3/2002 |

OTHER PUBLICATIONS

European Search Report dated Oct. 25, 2004.

* cited by examiner

Primary Examiner—Mark Hellner
(74) Attorney, Agent, or Firm—Stass & Halsey LLP

(57) ABSTRACT

Light input from a single-mode fiber is collected into linear light beams by a line focuser, and collected on a VIPA element. A light beam output from the VIPA element is made to pass through a space filter having a predetermined transmission loss characteristic, and focused on a mirror with a focusing lens. The light is reflected by the mirror, again passes through the space filter via the focusing lens, enters the VIPA element, and again enters the single-mode fiber via the line focuser. The insertion loss wavelength characteristic of the wavelength dispersion compensator using the VIPA element is optimized by being superimposed on the transmission loss characteristic of the space filter.

14 Claims, 17 Drawing Sheets

REFLECTANCE : R5<R4<R3<R2<R1<R0 (dB)

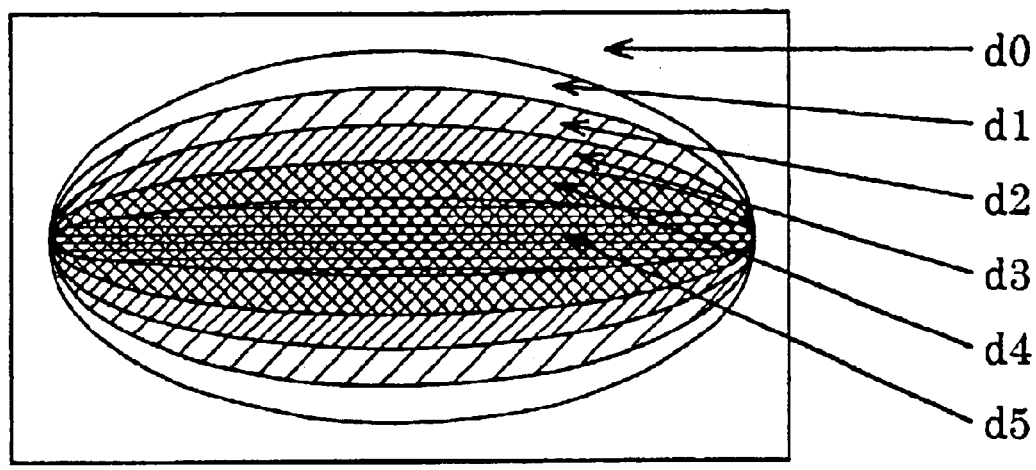
FILM THICKNESS : d5<d4<d3<d2<d1<d0
F I G. 12

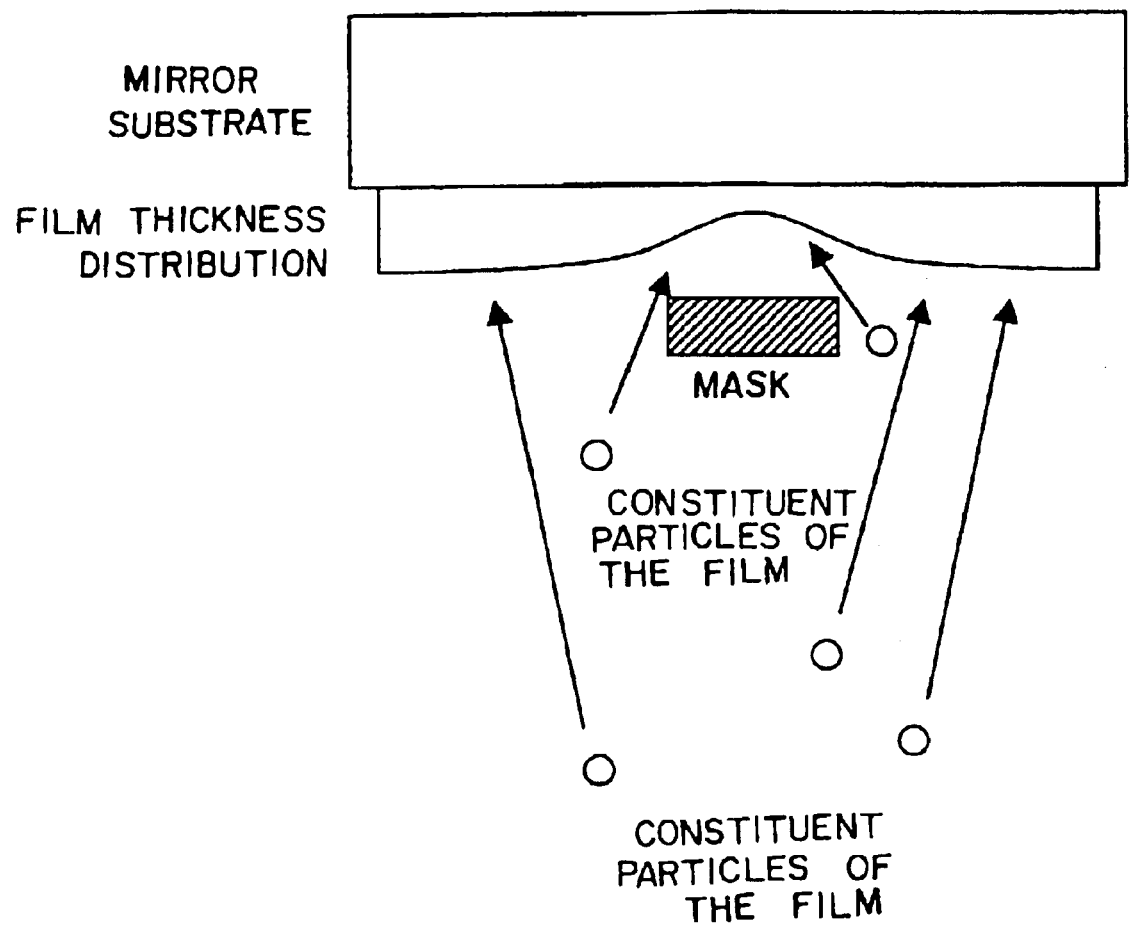
F I G. 13

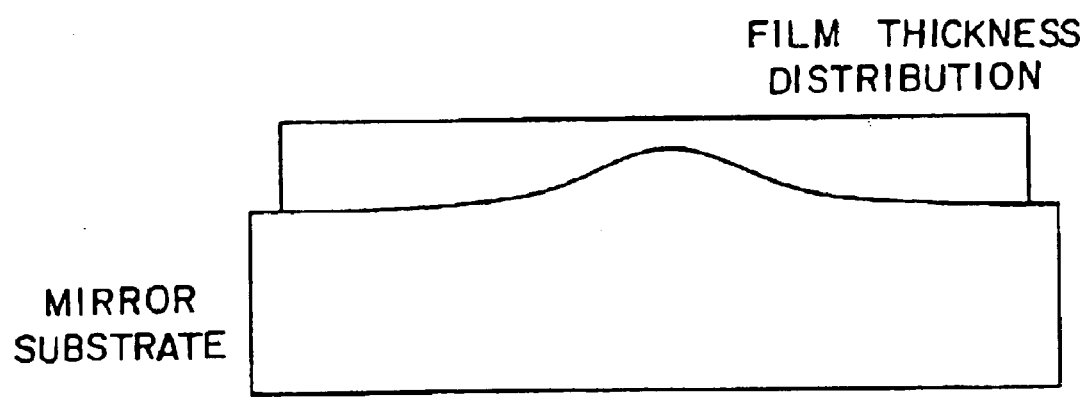
F I G. 15

DISPERSION COMPENSATOR WHOSE TRANSMISSION BAND IS FLATTENED

BACKGROUND OF THE INVENTION

1. Field of the Invention

The present invention relates to a dispersion compensator of optical communications technology.

2. Description of the Related Art

Recently, a wavelength dispersion compensator, which compensates for wavelength dispersion in an optical communication by using an optical element called a VIPA element, has been studied and developed.

FIG. 1 shows the basic configuration of a wavelength dispersion compensator using a VIPA element.

The VIPA element is configured by forming reflection planes on both sides of a parallel flat plate of glass, etc., and by arranging an irradiation window for inputting light to part of a reflection plane. In a typical configuration, one of reflectances of the reflected planes is approximately 100%, whereas the other is equal to or lower than 100%, typically, 95% or so.

An optical signal used in an optical communication is input from a single-mode fiber to a line focuser. In the line focuser, the light output and spread from the single-mode fiber is once made into parallel light beams, and then collected into linear light with a cylindrical lens, etc. The light collected by the line focuser passes through the irradiation window of the VIPA element, and is collected on the inside of the VIPA element.

When the light that is collected into linear light is input to the VIPA element, light output from the opposite side has an output characteristic having angular dispersion like a transmission grating or a prism. Namely, light input to the VIPA element is reflected on the reflection planes of the VIPA element, and multiple-reflected within the VIPA element. At this time, since the reflectance of one of the reflection planes is lower than 100%, the multiple-reflected light is output from this reflection plane little by little. Then, output light beams interfere with one another, so that light beams whose proceeding directions differ depending on wavelengths are generated. Here, a light beam output at each reflection appears to be output from a different virtual image VI when viewed from the output side of the VIPA element.

This light beam is collected by a focusing lens, and reflected on a mirror. The light beam then passes through the focusing lens and the VIPA element, and is coupled by the single-mode fiber that forms the line focuser. Here, attention is paid to one light beam. When the light beam is reflected on the mirror, passes through the focusing lens, and again enters the VIPA element, a difference exists between the optical distances of virtual image VIs as is known from FIG. 1 if the virtual image VI from which the light beam is output is made to differ from the virtual image VI to which the light beam that again enters the VIPA element is input, depending on a wavelength of a light beam. Therefore, an optical distance traveled by a light beam differs depending on a wavelength. That is, since a distance traveled by a light beam differs depending on a wavelength, the light beam is output from the VIPA element with a propagation delay according to the wavelength. Accordingly, a light beam having a different wavelength undergoes different wavelength dispersion (chromatic dispersion), and is output from the VIPA element. A dispersion compensator implemented by using this phenomenon is a wavelength dispersion compensator using a VIPA element.

However, if a coupling loss of light to this wavelength dispersion compensator is minimized, a level of an optical signal differs depending on a wavelength and is output if such a wavelength dispersion compensator is used for an optical signal like wavelength-multiplexed light. This is because an insertion loss transmission characteristic of the VIPA element is not flat. Especially, in a wavelength-multiplexed light communications system that has been put into practical use in recent years, it is desirable that light having each wavelength maintains a predetermined optical level, and is transmitted. Therefore, optimization such as flattening of an insertion loss wavelength characteristic of a transmission channel band of an optical element, and by extension, flattening, etc. of an insertion loss of a transmission channel bandwidth of the periphery of the dispersion compensator, its system, and entire network must be performed.

SUMMARY OF THE INVENTION

An object of the present invention is to provide a dispersion compensator that can flatten or can make into a desired characteristic the transmission band of light.

A dispersion compensator according to the present invention comprises: a wavelength dispersion compensating unit composed of an angular dispersing unit outputting input light in a different direction depending on each wavelength, and a mirror unit reflecting the light output from the angular dispersing unit, and again inputting the light to the angular dispersing unit; and an optimizing unit optimizing an insertion loss wavelength characteristic of the wavelength dispersion compensating unit.

According to the present invention, it is possible to make the insertion loss wavelength characteristic of the dispersion compensator into a desired characteristic, and especially, to easily flatten an insertion loss wavelength characteristic having steep wavelength dependency. It is also possible to make the insertion loss wavelength characteristic of not only the dispersion compensator but also peripheral devices including the dispersion compensator, an optical communications system or network including the dispersion compensator into a desired characteristic with the optimizing unit.

Accordingly, even if the insertion loss wavelength characteristic of the dispersion compensator, its peripheral devices, optical communications system or network, etc. steeply changes over a bandwidth where an optical signal is propagated, it can be corrected to a characteristic suitable for propagating the optical signal.

BRIEF DESCRIPTION OF THE DRAWINGS

FIG. 12 explains the method manufacturing a mirror whose reflectance exhibits a two-dimensional distribution (No. 3);

FIG. 13 explains the method manufacturing a mirror whose reflectance exhibits a two-dimensional distribution (No. 4);

FIG. 15 explains another method manufacturing a mirror whose reflectance exhibits a two-dimensional distribution;

DESCRIPTION OF THE PREFERRED EMBODIMENTS

Figure 1:
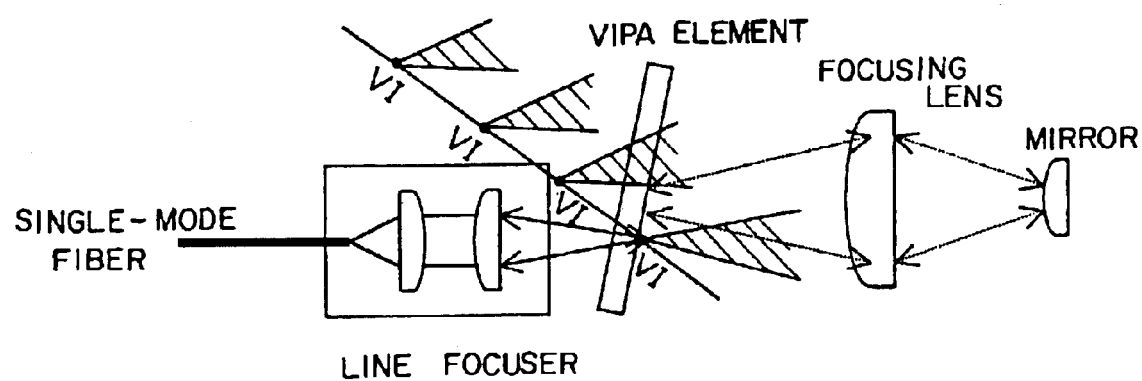
FIG. 1 shows the basic configuration of a wavelength dispersion compensator using a VIPA element.

Preferred embodiments according to the present invention provide the following configurations and their operations.

A space filter whose transmittance distributes two-dimensionally is inserted between a VIPA plate (or a VIPA element) and a focusing lens, or between the focusing lens and a mirror. Or, a two-dimensional reflectance is made to distribute on the surface of the mirror. Furthermore, a periodical characteristic filter whose transmission loss characteristic has periodicity, such as an etalon filter, etc. is inserted in a line focuser.

By inserting the space filter or the periodical characteristic filter, the insertion loss characteristic of the dispersion compensator and the transmission loss characteristic of the space filter or the periodical characteristic filter are superimposed, so that an optimized insertion loss wavelength characteristic of a transmission channel band can be obtained.

Additionally, by making a mirror reflectance distribute two-dimensionally, the mirror reflectance characteristic and the original insertion loss characteristic of the wavelength dispersion compensation are superimposed, so that an optimized insertion loss wavelength characteristic of a transmission channel band can be obtained.

Furthermore, by inserting an etalon filter with which a periodical transmission characteristic can be obtained, an insertion loss wavelength characteristic of a transmission channel band, which is optimized by superimposing the insertion loss characteristic of the dispersion compensator on the transmission loss characteristic of the etalon filter, can be obtained.

Accordingly, optimizations such as flattening, etc. of the insertion loss wavelength characteristic of a transmission channel band of the periphery of the wavelength dispersion compensator, its system and entire network can be performed.

Control of the space filter or the mirror reflectance is performed as follows.

Since an element, an ion, or a compound has the property of absorbing light, its concentration is made to distribute two-dimensionally, so that the space filter whose transmittance distributes two-dimensionally is obtained. Since the principle that the transmittance of light becomes small is light absorption, reflected light does not become a problem.

If the thickness of a metal reflection film is thin, its reflectance varies depending on its thickness,. Therefore, a mirror having a two-dimensional reflectance distribution is formed by imparting a two-dimensional thickness distribution to the metal reflection film.

If the two-dimensional film thickness distribution is imparted to the metal reflection film, the shape of the surface of the mirror differs from a designed shape, leading to a degradation of optical characteristics such as dispersion, a group delay, etc. in some cases. Therefore, the shape of a mirror substrate is formed by expecting the thickness distribution of the metal film, and a desired mirror shape is obtained, so that the degradation of the optical characteristics can be prevented.

Additionally, if a two-dimensional thickness distribution is imparted to the metal reflection film, the shape of the surface of the mirror differs from a designed shape, and optical characteristics such as wavelength dispersion, a group delay, etc. are sometimes degraded.

To overcome this problem, the metal reflection film having the two-dimensional thickness distribution is formed as two layers (or more), and a two-dimensional thickness distribution is imparted to the first layer metal reflection film on the input side of light, so that a reflectance distribution is made to occur. At the same time, a thickness distribution reverse to the first layer metal film is imparted to the second layer metal film or a dielectric film on the input side of light, so that the shape of the surface of the mirror substrate can be maintained as a designed value unchanged, and the degradation of the optical characteristics can be prevented.

The metal reflection film can be formed with a film forming technique such as sputtering, vapor deposition, etc. Here, a thickness distribution is generated by changing the probability that the constituent particles of the film adhere to the substrate with the use of a mask preventing the proceeding of constituent particles of a film.

Figure 2:
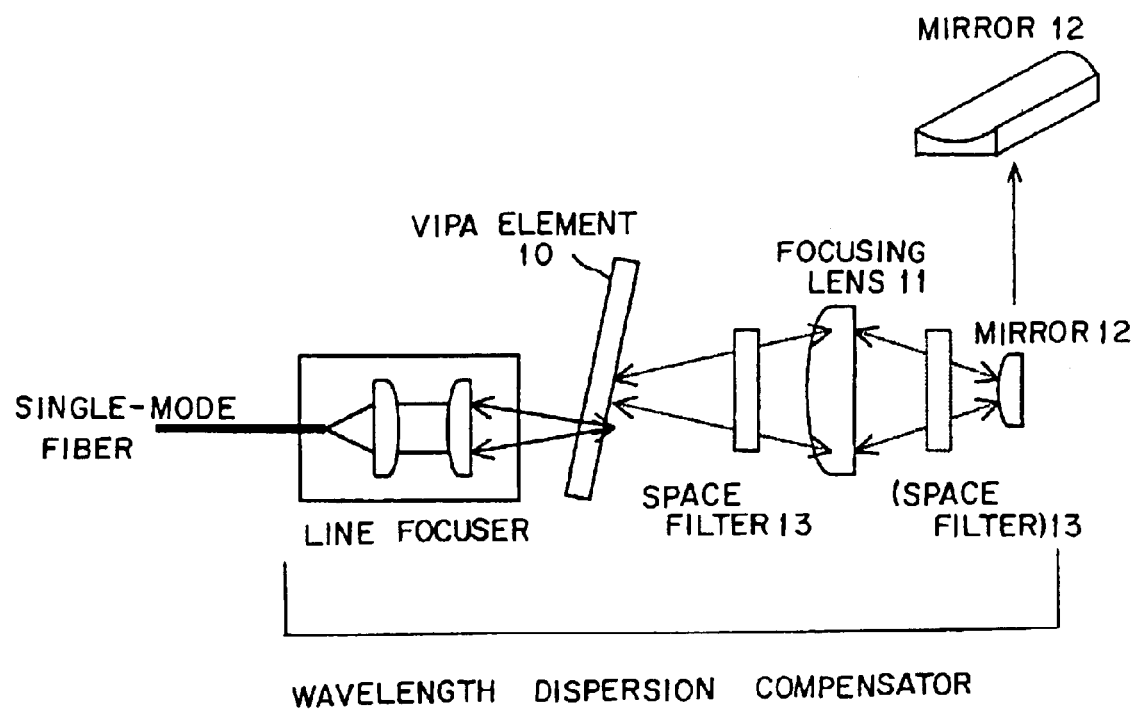
FIG. 2 exemplifies a first configuration using a space filter according to a preferred embodiment of the present invention.

FIG. 2 exemplifies a first configuration using the space filter according to the preferred embodiment of the present invention.

As shown in this figure, in this preferred embodiment, a space filter 13 is arranged between a VIPA element 10, which is explained with reference to FIG. 1, and a focusing lens 11, or between the focusing lens 11 and a mirror 12 of an angular dispersion compensator.

Here, the mirror 12 is a mirror whose curved surface continually changes in a way such that one end has a concave surface, the central part has a plain surface, and the other end has a convex surface.

The curved surface of the mirror 12 is continually changed in the direction orthogonal to the direction of the paper (the direction where angular dispersion is given by the VIPA), so that a wavelength dispersion amount can be adjusted to an arbitrary value.

At this time, the space filter 13 is moved in correspondence with the mirror 12.

Figure 3:
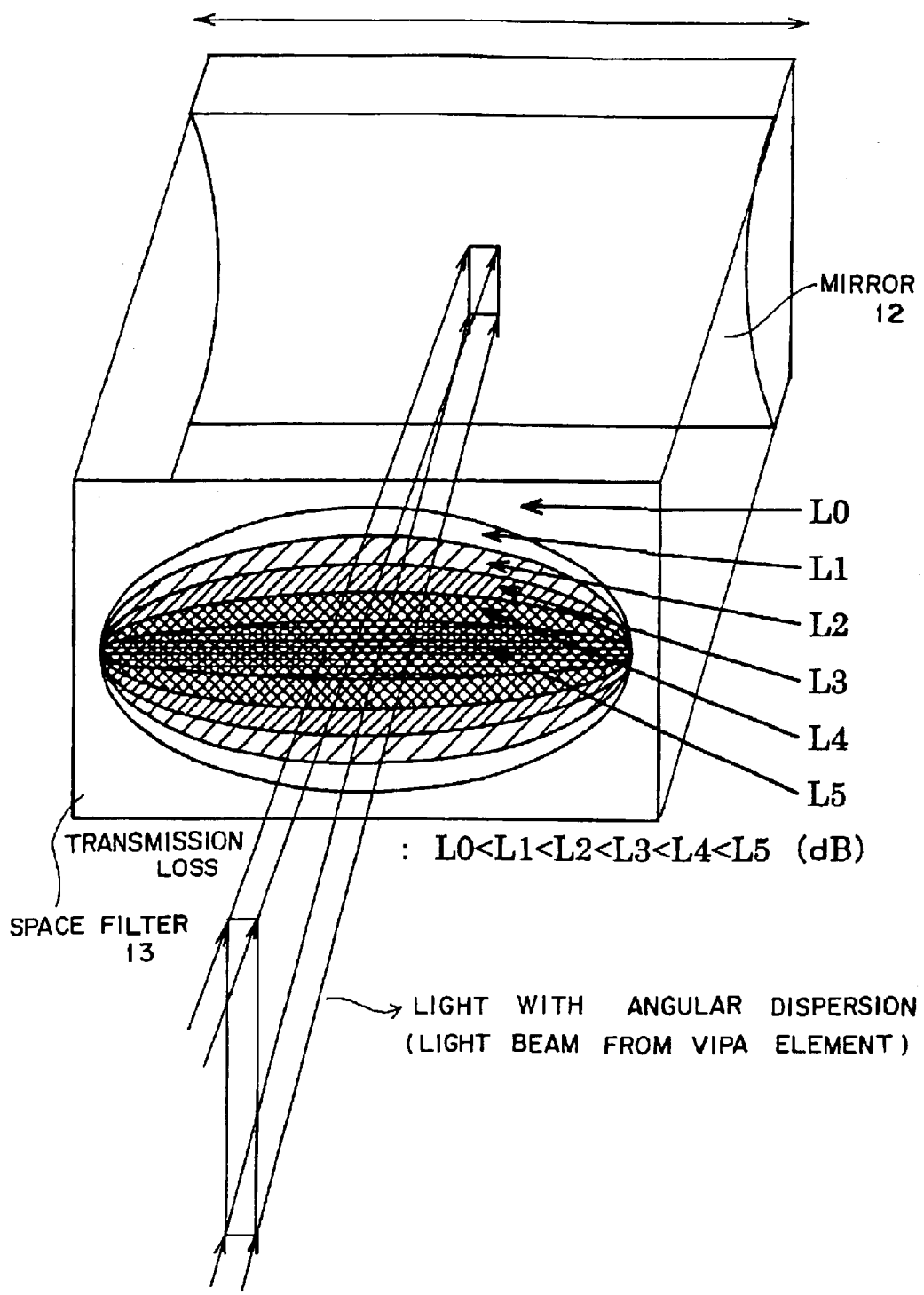
FIG. 3 shows the relationship between the transmission loss distribution of the space filter and a mirror.

FIG. 3 shows the relationship between the transmission loss distribution of the space filter and the mirror.

In this figure, the transmission loss gradually increases from L0 to L5. This figure assumes the case where the insertion loss characteristic of the VIPA element or the entire wavelength dispersion compensator is small in the proximity of the center of the transmission band, and sharply increases as apart from the center. In this case, the loss is the largest in the L5 region in the proximity of the center of the space filter, which corresponds to the proximity of the center of the transmission band, and gradually decreases toward the periphery of the space filter.

Here, since the space filter 13 is moved in correspondence with the mirror 12, the filter is configured so that its transmission loss distribution converges in the form of an ellipse in the left and the right direction of the sheet of paper.

This is because the loss distribution to be given to a light beam that passes through the space filter differs for the light (a light beam from the VIPA element) which is given an angular dispersion according to a position where the mirror 12 moves (the mirror 12 moves according to the dispersion amount in the direction indicated by an arrow).

Namely, the ends of the mirror 12 in the move direction are shaped like convex and concave so that a loss distribution of the space filter 13 is narrow in the direction of the angular dispersion, and the loss distribution of the space filter 13 where the shape of the mirror 12 is flat, largely distributes outside in the direction of the angular dispersion of a light beam. Therefore, the space filter 13 has a loss distribution in the form of an ellipse in the move direction of the mirror 12 in correspondence with the curved surface of the mirror 12.

The loss distribution can be arbitrarily configured in correspondence with the shape of the curved surface of the mirror.

Figure 4:
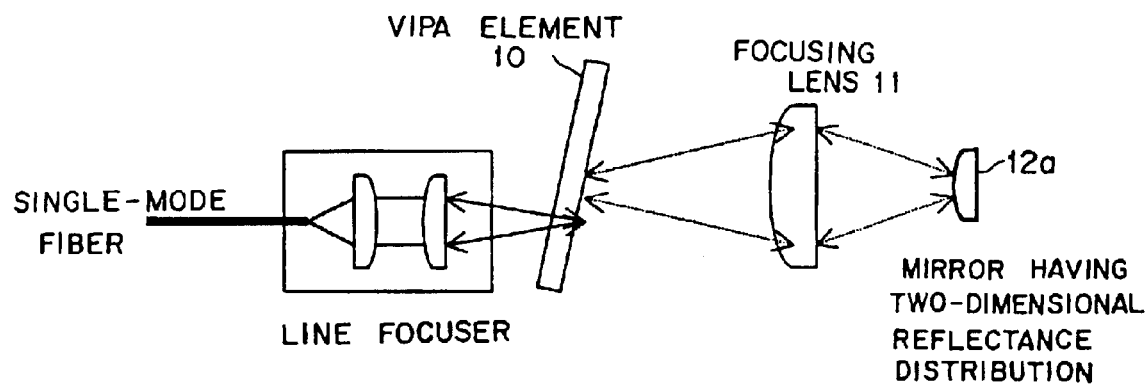
FIG. 4 exemplifies a second configuration according to a preferred embodiment of the present invention.

FIG. 4 exemplifies a second configuration according to a preferred embodiment of the present invention.

In the configuration example shown in FIG. 4, the reflectance of the surface of a mirror 12a is changed two-dimensionally. Namely, a loss is made large on the surface where strong light is irradiated, and made small on the surface where weak light is irradiated.

Also in FIG. 4, the mirror 12a, whose reflection plane continually changes from concave to convex, is moved in the direction perpendicular to the sheet of paper in a similar manner as in FIG. 2.

Figure 5:
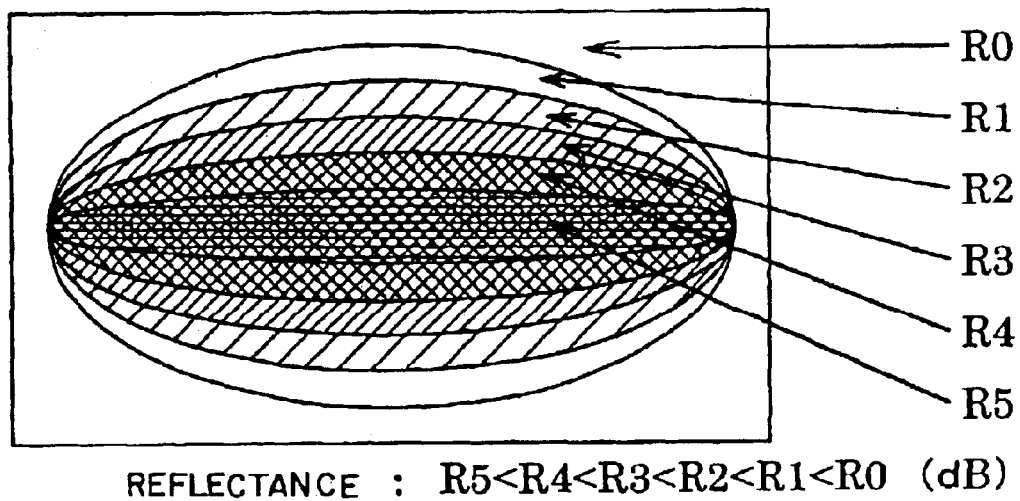
FIG. 5 shows a reflectance distribution of a mirror having a two-dimensional reflectance distribution.

FIG. 5 shows the reflectance distribution of a mirror having a two-dimensional reflectance distribution.

In this figure, the reflectance is configured to gradually increase from R5 to R0. Also in the case shown in FIG. 5, an assumed loss insertion characteristic of the VIPA element or the wavelength dispersion compensator is similar to that in the case shown in FIG. 4. Accordingly, the reflectance is the smallest in the R5 region that is the proximity of the center of the transmission band where the intensity of input light is the highest, and the largest in the R0 region where the intensity of input light is the lowest.

A distribution of this reflectance is configured in correspondence with the shape of the curved surface of the reflection plane similar to the distribution of the transmission loss of the space filter 13 shown in FIG. 2.

Figure 6:
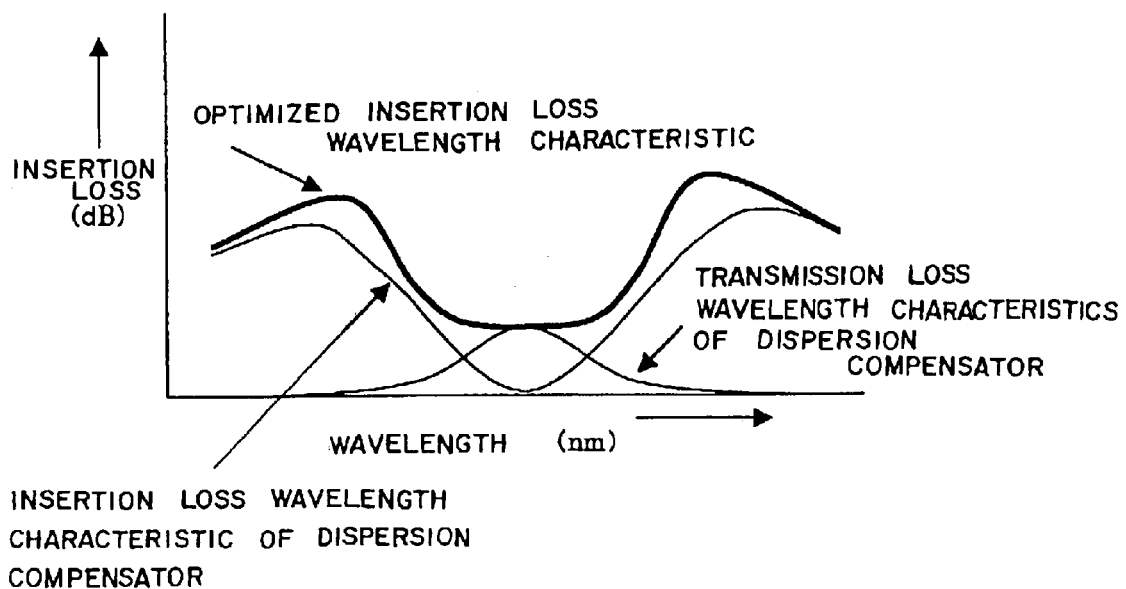
FIG. 6 shows an optimized insertion loss wavelength characteristic when the space filter is used.
Figure 7:
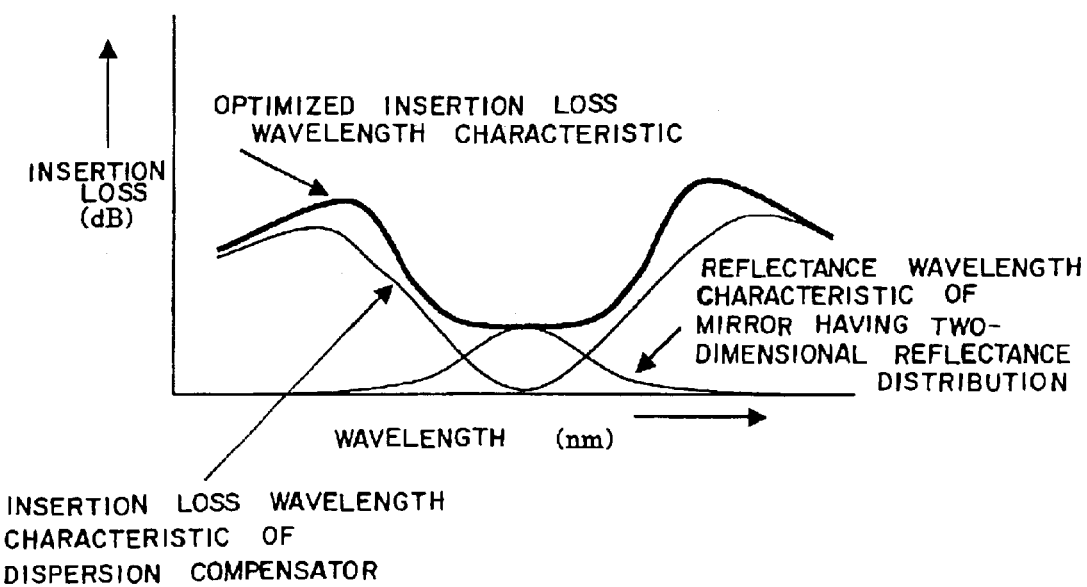
FIG. 7 shows an optimized insertion loss wavelength characteristic when the reflectance of the mirror is changed two-dimensionally.

FIGS. 6 and 7 explain the effects of the configuration examples of the preferred embodiments shown in FIGS. 2 to 5.

FIG. 6 shows an optimized insertion loss wavelength characteristic when the space filter is used.

The insertion loss wavelength characteristic of the wavelength dispersion compensator is optimized by being superimposed on the transmission loss wavelength characteristic of the space filter, so that the optimized insertion loss wavelength characteristic is implemented. Here, the optimization is not limited to the widening of a flattened transmission channel band, and indicates the equalization of the transmission channel band of the periphery of the wavelength dispersion compensator (peripheral devices including the wavelength dispersion compensator), and an optical communications system and an entire optical communications network, which include the wavelength dispersion compensator, and also indicates the optimization of the insertion loss wavelength characteristic by adjusting the transmittance of the space filter, for the insertion loss wavelength characteristic of the wavelength dispersion compensator.

FIG. 7 shows an optimized insertion loss wavelength characteristic in the case where the reflectance of the mirror is changed two-dimensionally.

As shown in this figure, the insertion loss wavelength characteristic of the wavelength dispersion compensator is optimized by being superimposed on the reflectance wavelength characteristic of the mirror having a two-dimensional reflectance distribution, so that the optimized insertion loss wavelength characteristic is implemented. Here, the optimization is not limited to the widening of a flattened transmission channel band, and indicates the equalization of the transmission channel band of the periphery of the wavelength dispersion compensator (peripheral devices including the wavelength dispersion compensator), and an optical communication system and an entire optical communications network, which include the wavelength dispersion compensator, and also indicates the optimization of the insertion loss characteristic by adjusting the transmittance of a space filter, for the insertion loss wavelength characteristic of the wavelength dispersion compensator.

As described above, the insertion loss wavelength characteristic of the wavelength dispersion compensator can be flattened with the space filter having a suitable transmission loss characteristic or the mirror having a suitable reflectance. As stated earlier, according to this preferred embodiment, the insertion loss wavelength characteristic of the wavelength dispersion compensator can be controlled in a variety of ways by changing the transmission loss of the space filter or the reflectance of the mirror, and the object to vary the insertion loss wavelength characteristic is not necessarily limited to the flattening of the transmission band.

Additionally, the following examples can be considered as examples to which this preferred embodiment is applied.

(1) An optical coupler/splitter using the wavelength periodical characteristic of an insertion loss versus wavelength characteristic.

A device having the transmission loss wavelength characteristic of the space filter that is shown in FIG. 5 and is repeated periodically in a wavelength dimension, which is disclosed by a known technique such as the U.S. Pat. No. 5,809,190, etc., is connected in series, so that the optimized insertion loss wavelength characteristic shown in FIG. 5 can be implemented.

(2) An optical signal waveform degradation compensator using a wavelength transmittance control device (such as an etalon, etc.)

A device having a wavelength characteristic that is repeated periodically in a wavelength dimension and implemented by an etalon, etc., which is disclosed by a known technique such as Japanese Laid-Open Patent Publication No. 11-72756, etc., is connected in series, so that the optimized insertion loss wavelength characteristic shown in FIG. 6 can be implemented.

Figure 8:
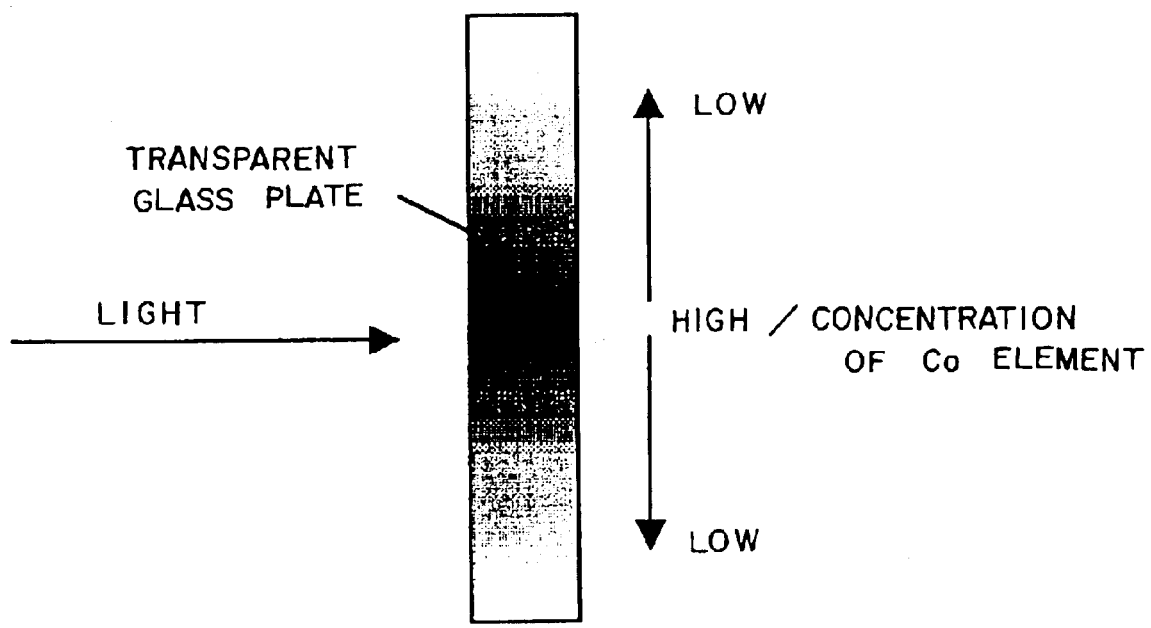
FIG. 8 explains a space filter having a two-dimensional transmittance distribution.

FIG. 8 explains a space filter having a two-dimensional transmittance distribution.

The space filter having the two-dimensional transmittance distribution shown in FIG. 3 can be obtained by spreading, for example, Co being a transition metal as an element which absorbs light within a plate composed of a transparent material such as glass, and by making its concentration distribute two-dimensionally. Note that a transparent material such as plastic, etc., may be available instead of glass, and Cr, Cu, Fe, Ni, Mn, V, etc., which are transition metal elements other than Co, or their ions, a compound such as an oxide, an organic metal, etc., Al being a typical metal element, and Er, Nd, etc. being rare-earth elements may be available.

Thus obtained space filter having the two-dimensional transmittance distribution is arranged between the VIPA element and the mirror within the dispersion compensator, whereby the optimized insertion loss wavelength characteristic shown in FIG. 6 can be implemented. Additionally, at this time, a light beam passes through the space filter twice. Therefore, its transmission characteristic must be designed to become the characteristic shown in FIG. 6 after passing through the space filter twice. It is desirable from the principle of a VIPA dispersion compensator to arrange the space filter as close as possible to the mirror between the focusing lens 11 and the mirror 12 in FIG. 2. This is because a position of the space filter through which a light beam passes significantly varies depending on a wavelength Because the principle that the transmittance of light becomes small is light absorption, reflected light does not occur, and does not degrade the optical characteristics of the dispersion compensator. This preferred embodiment refers to the example where the material absorbing light is made to two-dimensionally distribute on a transparent substrate of glass, etc. However, a film having an extinction distribution, which is generated by making the concentration of such a light absorbing material distribute two-dimensionally, or a film having an absorption distribution, which is generated by making the thickness of a light absorbing film distribute two-dimensionally, may be available.

Figure 9:
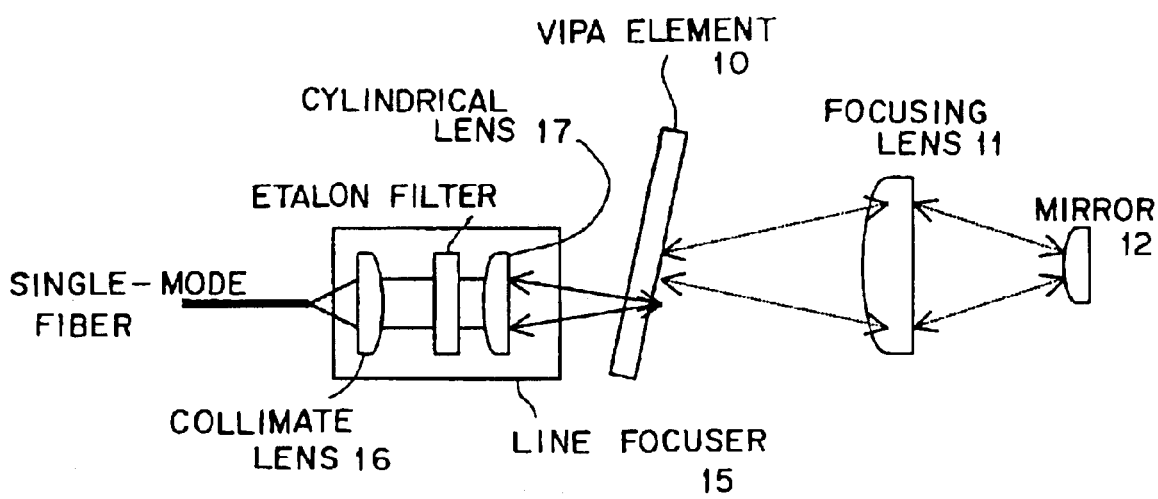
FIG. 9 exemplifies another configuration using an etalon filter according to a preferred embodiment of the present invention.

FIG. 9 exemplifies another configuration using the etalon filter according to the preferred embodiment of the present invention.

As shown in this figure, the optimized insertion loss wavelength characteristic shown in FIG. 6 can be implemented also by inserting the etalon filter having a periodical transmission characteristic in between a collimate lens 16 and a cylindrical lens 17 within a line focuser of a wavelength dispersion compensator, between which a collimated light beam travels. At this time, the light beam passes through the etalon filter twice from when it enters from a single-mode fiber till when it again enters the single-mode fiber after being reflected off a mirror. Therefore, its transmission characteristic must be designed to become the characteristic shown in FIG. 6 after passing through the etalon filter twice.

Here, for example, if the insertion loss wavelength characteristic of the dispersion compensator, which is shown in FIG. 6, is flattened, an adjustment is made in such a way that a low portion of the transmittance of the etalon filter is positioned in a portion corresponding to a small loss of the insertion loss wavelength characteristic of the dispersion compensator.

In this preferred embodiment, the etalon filter is not moved in correspondence with the move of the mirror 12 as in the previous preferred embodiment, but fixed.

FIGS. 10 to 14 explain a method manufacturing a mirror whose reflectance exhibits a two-dimensional distribution.

Figure 10:
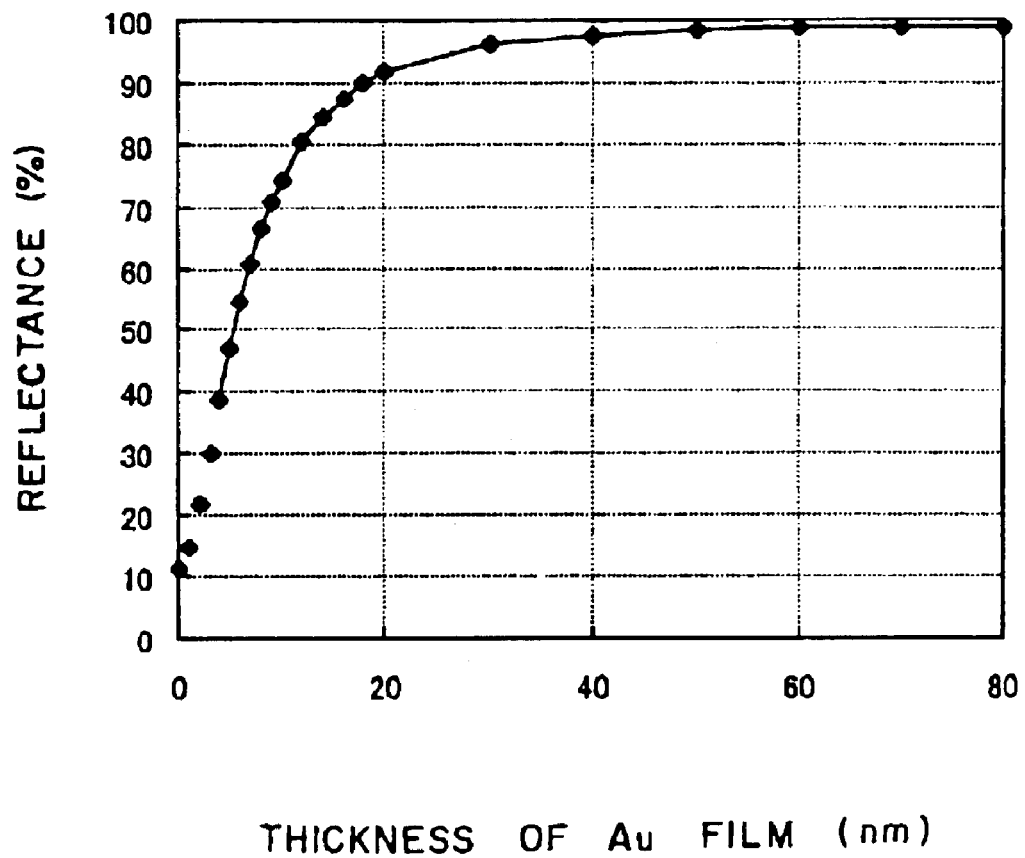
FIG. 10 explains a method manufacturing a mirror whose reflectance exhibits a two-dimensional distribution (No. 1)
Figure 11:
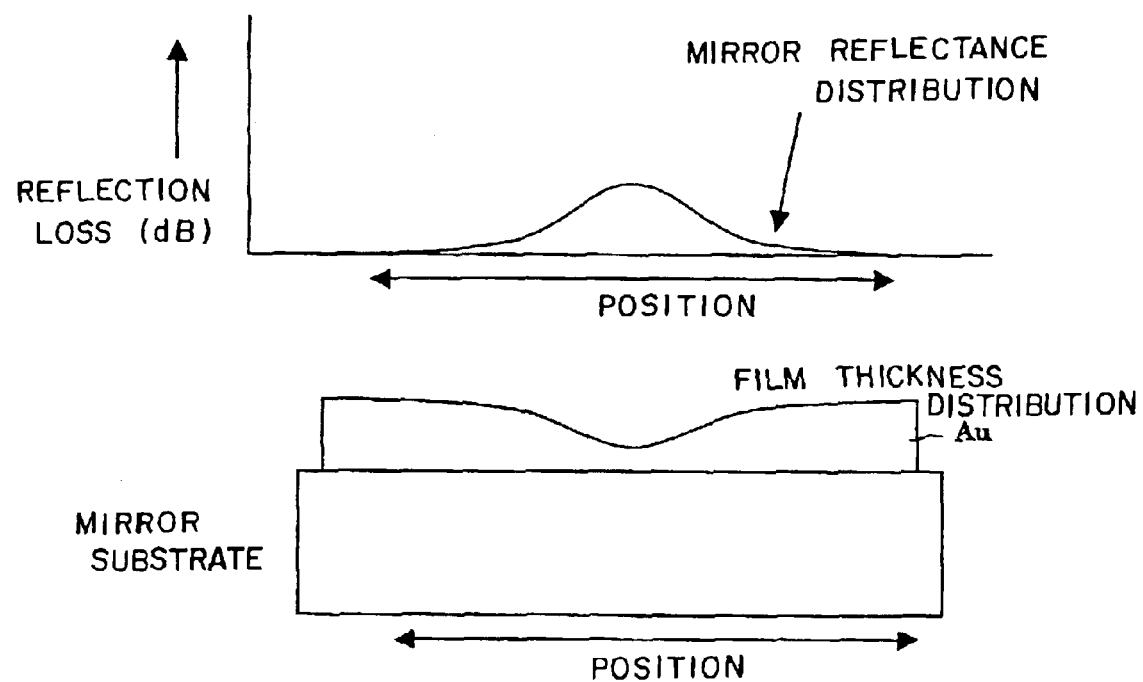
FIG. 11 explains the method manufacturing a mirror whose reflectance exhibits a two-dimensional distribution (No. 2)
Figure 14:
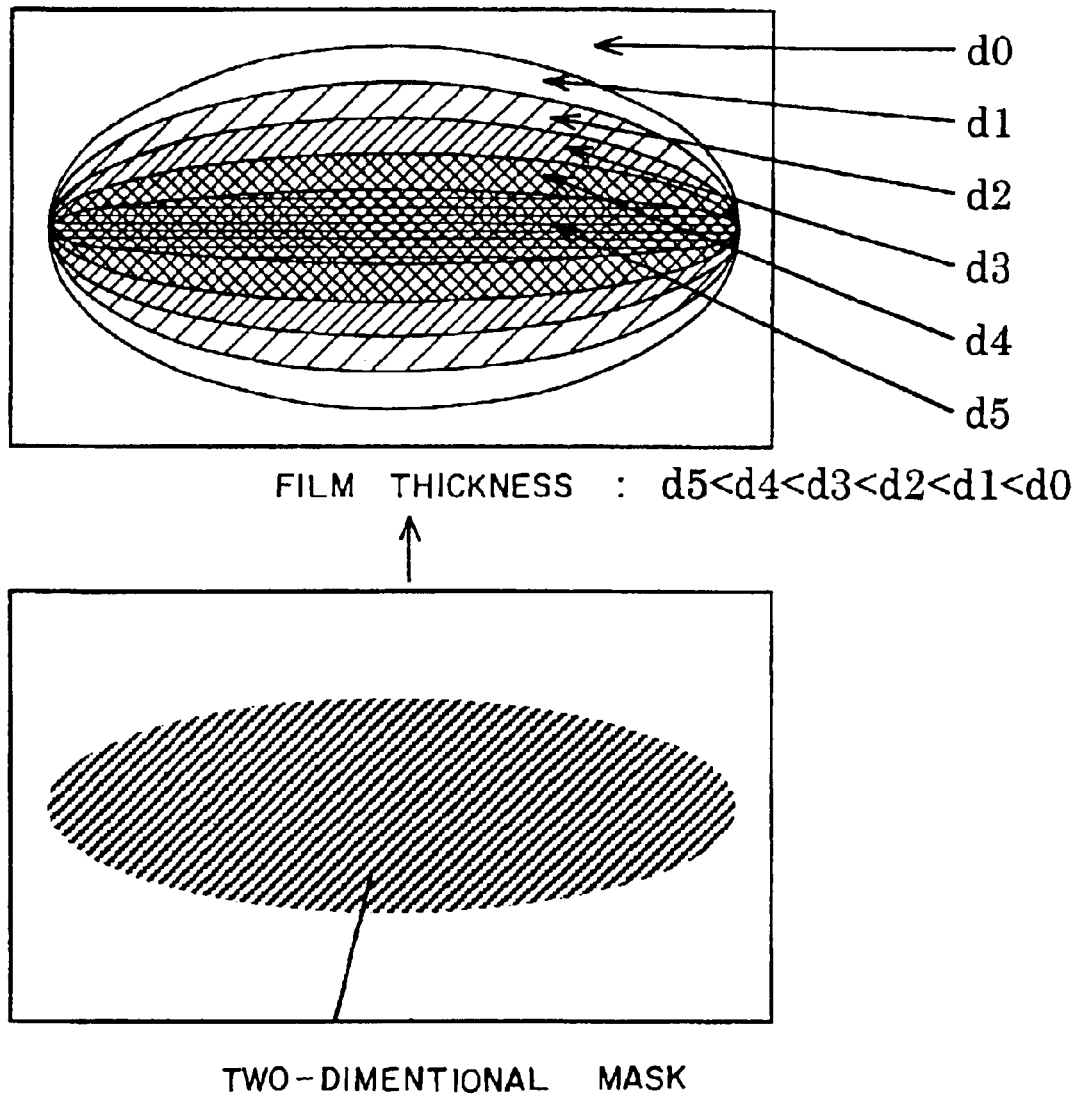
FIG. 14 explains the method manufacturing a mirror whose reflectance exhibits a two-dimensional distribution (No. 5)

As a metal used as a metal reflection film of the mirror, for example, Au is available. However, if the thickness of an Au film is equal to or thinner than 80 nm as shown in FIG. 10, a positive correlation exists between the thickness of the film and its reflectance. Accordingly, if the thickness of the Au film is adjusted within the range of equal to or thinner than 80 nm as shown in FIG. 11, a mirror whose reflectance distributes spatially is obtained. In the example shown in FIG. 11, a Au metal reflection film whose central thickness is thin is arranged on a mirror substrate. If the thickness of the Au metal film varies within the range of 80 nm as shown in an upper stage of FIG. 11, it exerts an influence on the reflectance of the mirror. Namely, a reflection loss is large in the proximity of the center of the Au film, and accordingly, its reflectance can be set to a small value. Furthermore, the thickness of the Au film is made to two-dimensionally distribute as shown in FIG. 12, whereby it becomes possible make the reflectance two-dimensionally distribute as shown in FIG. 5.

The film thickness distribution shown in FIG. 11 can be generated by changing the probability that the constituent particles of a film (Au fine particles, atoms, etc.) adhere to the substrate, for example, with the use of a mask which prevents the proceeding of constituent particles of a film as shown in FIG. 13. Furthermore, a two-dimensional film thickness distribution shown in FIG. 12 can be imparted by using a two-dimensional mask shown in FIG. 14.

This preferred embodiment refers to the case where Au is used. However, other metals such as Ag, Al, Cr, etc. may be available, and a used metal is not limited particularly.

Thus obtained mirror having the two-dimensional reflectance is used for the wavelength dispersion compensator as shown in FIG. 4, whereby the optimized insertion loss wavelength characteristic shown in FIG. 7 can be implemented.

FIG. 15 explains another method manufacturing a mirror whose reflectance distributes two-dimensionally.

If a metal film is configured as one layer as shown in FIGS. 10 to 14, strictly speaking, the shape of the mirror substantially becomes the surface of the metal film as shown in FIG. 11. Therefore, it can possibly differ from the original shape of the surface of the mirror substrate due to the thickness distribution of the metal film. With the wavelength dispersion compensator using the VIPA element, optical characteristics such as wavelength dispersion, a group delay, etc., which the wavelength dispersion compensator gives to light, are determined depending on the shape of the mirror. Therefore, the optical characteristics such as wavelength dispersion, a group delay, etc. are sometimes degraded because the shape of the mirror differs from the original shape.

Accordingly, the shape of the mirror is formed by taking into account a film thickness distribution as shown in FIG. 15, so that a desired mirror shape can be obtained, and the optical characteristics can be prevented from being degraded.

Figure 16:
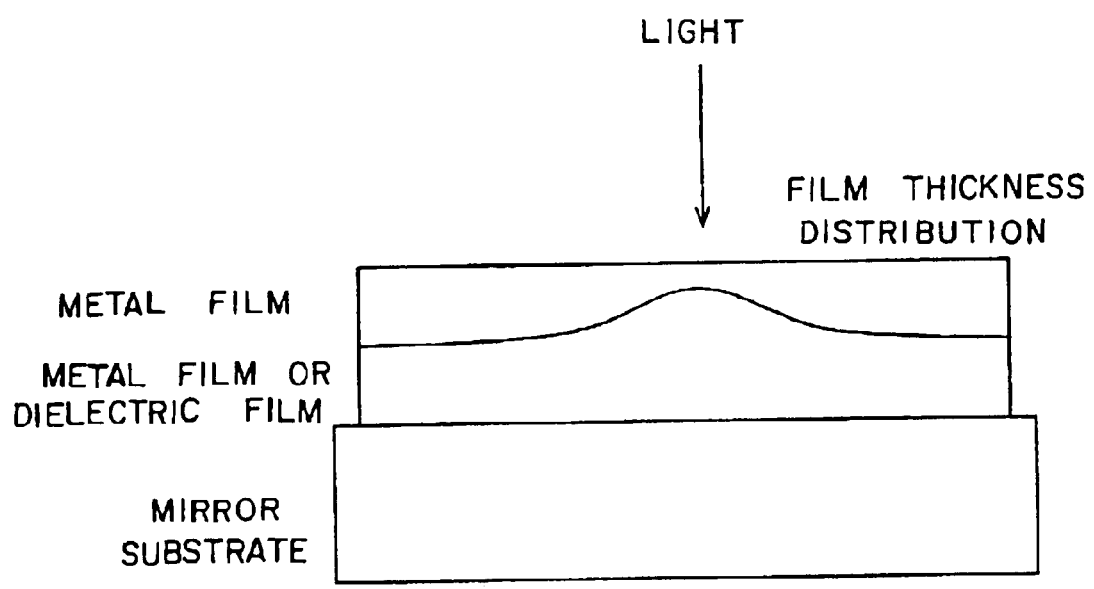
FIG. 16 explains a further method manufacturing a mirror whose reflectance exhibits a two-dimensional distribution (No. 1)
Figure 17:
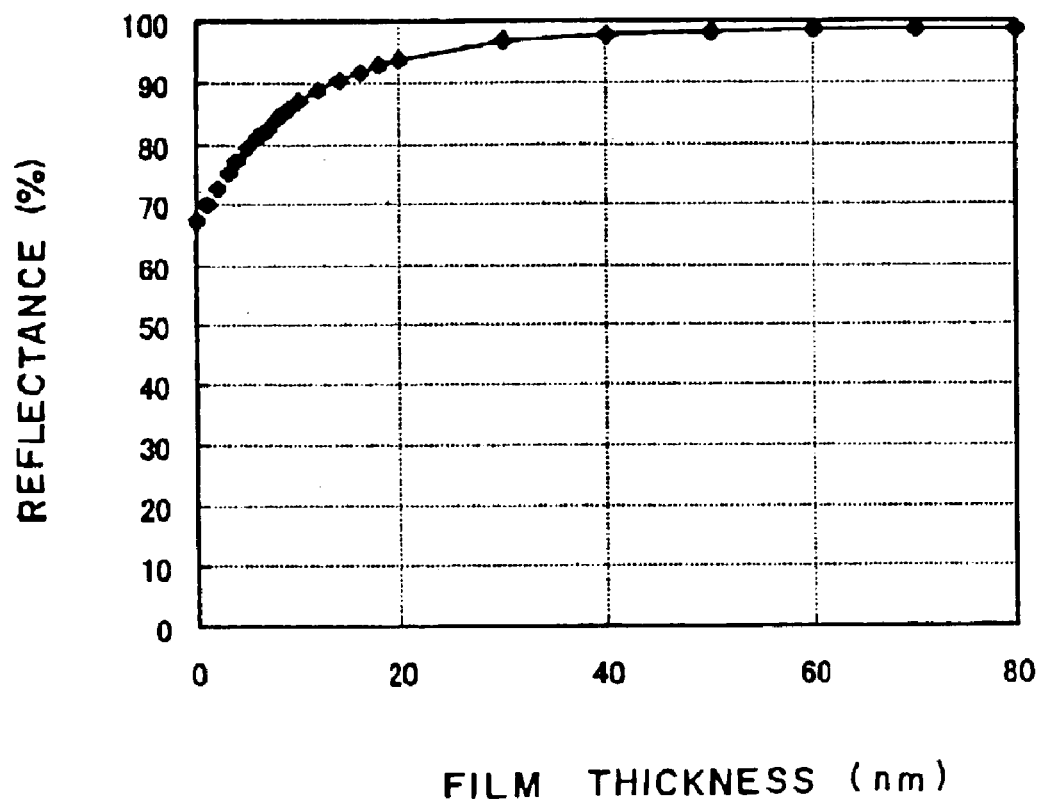
FIG. 17 explains the further method manufacturing a mirror whose reflectance exhibits a two-dimensional distribution (No. 2).

FIGS. 16 and 17 explain a further method manufacturing a mirror whose reflectance distributes two-dimensionally.

Also the manufacturing method shown in FIG. 15 can prevent the optical characteristics from being degraded due to a film thickness distribution. However, this method makes the process of a mirror complex.

Therefore, a metal reflection film having a two-dimensional thickness distribution is configured as two layers as shown in FIG. 16, and a two-dimensional thickness distribution is imparted to the first layer metal reflection film on the input side of light, so that a reflectance distribution is made to occur. At the same time, a thickness distribution reverse to that of the first layer metal film may be imparted to the second layer metal film on the input side of light so as to make the thickness of the entire reflection film uniform. As a result, the shape of the surface of the mirror substrate can be maintained as a designed value unchanged, and the optical characteristics can be prevented from being degraded.

Here, if Au whose reflectance is high is used as the first layer metal reflection film on the input side of light, reflection from the surface of a $SiO_2$ film whose reflectance is low (<4%) as the second layer metal film on the input side of light can be ignored. Therefore, a correlation, which is almost similar to that shown in FIG. 10, can be obtained between the thickness of the Au film and the reflectance. Note that dielectric films of $Al_2O_3$, $MgF_2$, $La_2O_3$, etc. are available other than $SiO_2$.

Additionally, a sufficiently thick metal film of Cr, etc., whose reflectance is somewhat high (approximately 68%), is available as the second layer metal film on the input side of light. In this case, reflection from the surface of the Cr film cannot be ignored, but a positive correlation exists between the thickness of the Au film and the reflectance as shown in FIG. 17. Therefore, such a mirror can be designed.

Inversely, Au whose reflectance is high is used as the second layer metal film on the input side of light, and a metal film of Cr, etc., whose reflectance is somewhat low, is used as the first layer on the input side of light, so that a thickness distribution is imparted to the first layer of Cr, and a reflectance distribution can be also generated.

Note that a protection film of a dielectric film of $SiO_2$, etc. is coated on the metal reflection film, or Cr, Ni, etc. may be undercoated on the lower side of the metal reflection film, and the number of layers may be equal to or larger than 2.

A person having ordinary skill in the art can easily understand that the above described transmission loss of the space filter, the etalon filter, or the reflectance of the mirror can be designed by a computer simulation along with the insertion loss characteristic of the wavelength dispersion compensator using the VIPA element.

By optimizing the insertion loss characteristic of a wavelength dispersion compensator, the characteristics of an ultrahigh-speed, an ultralarge-capacity, and an ultralong-haul optical wavelength multiplexing transmitting device can be improved.

What is claimed is:

1. A dispersion compensator, comprising:
    a wavelength dispersion compensating unit comprising an angular dispersing unit outputting input light in a different direction depending on each wavelength, and a mirror unit reflecting the light output from the angular dispersing unit, and again inputting the light to the angular dispersing unit; and
    an optimizing unit optimizing an insertion loss wavelength characteristic of said wavelength dispersion compensating unit.

2. The dispersion compensator according to claim 1, wherein
    said optimizing unit is a space filter having a transmission loss characteristic which varies two-dimensionally.

3. The dispersion compensator according to claim 1, wherein
    said optimizing unit is integrated with the mirror unit by two-dimensionally changing a reflectance of a reflection plane of the mirror unit.

4. The dispersion compensator according to claim 1, wherein
    said optimizing unit performs optimizations including equalization of a transmission channel band or optimization of an insertion loss wavelength characteristic of peripheral devices, an optical communications system or network, which include the dispersion compensator.

5. The dispersion compensator according to claim 1, wherein
    said optimizing unit is an etalon filter.

6. The dispersion compensator according to claim 2, wherein
    an element, an ion or a compound, which absorbs light, is imparted to the space filter, so that concentration of the element, the ion or the compound changes two-dimensionally.

7. The dispersion compensator according to claim 3, wherein
    the mirror unit is configured by a reflection film whose thickness distribution changes two-dimensionally.

8. The dispersion compensator according to claim 7, wherein
    the mirror unit comprises the reflection film, and a mirror substrate on which the reflection film is arranged, and the mirror substrate is configured to compensate for a distortion of a shape of the reflection plane, which is caused by a change in a thickness of the reflection film.

9. The dispersion compensator according to claim 7, wherein
    the reflection film comprises at least two layers, and one layer has a thickness which provides a desired reflectance distribution, and a different layer is configured to make a thickness of a whole of the reflection film constant.

10. The dispersion compensator according to claim 9, wherein
    a thickness distribution of the different layer is a distribution reverse to a thickness distribution of the one layer.

11. The dispersion compensator according to claim 7, wherein
    the reflection film comprises at least two layers, and is configured to obtain a desired reflectance distribution by combining a reflectance distribution of one layer and a reflectance distribution of a different layer.

12. The dispersion compensator according to claim 7, wherein
    a thickness distribution of the reflection film, which changes two-dimensionally, is generated by changing a probability that constituent particles of a film adhere to a substrate.

13. An apparatus comprising:
    a virtually imaged phased array (VIPA) element receiving input light at a respective wavelength and producing corresponding output light traveling from the VIPA element in a direction determined by the wavelength of the input light;
    a mirror reflecting the output light back to the VIPA element so that the reflected output light travels through a VIPA generator, to thereby provide dispersion compensation to the input light; and
    an optimizing unit flattening an insertion loss wavelength characteristic of the respective wavelength.

14. The apparatus as in claim 13, wherein
    said optimizing unit is a filter positioned between the VIPA element and the mirror having a transmission loss changing in the direction orthogonal to the direction of the angular dispersion of the VIPA element.

* * * * *

UNITED STATES PATENT AND TRADEMARK OFFICE
CERTIFICATE OF CORRECTION

PATENT NO. : 6,909,537 B2
DATED : June 21, 2005
INVENTOR(S) : Yuichi Kawahata et al.

It is certified that error appears in the above-identified patent and that said Letters Patent is hereby corrected as shown below:

<u>Title page,</u>
Item [74], *Attorney, Agent, or Firm*, change "Stass" to -- Staas --.

Signed and Sealed this

Twenty-eighth Day of March, 2006

JON W. DUDAS
*Director of the United States Patent and Trademark Office*